United States Patent [19]

You

[11] Patent Number: 5,750,086
[45] Date of Patent: May 12, 1998

[54] PROCESS FOR PRODUCING ULTRAFINE PARTICLES OF COLLOIDAL CALCIUM CARBONATE

[76] Inventor: Kyu Jae You, 48, Nackdong-ri, Nam-myon, Jungsun-kun, Kangwon-do, Rep. of Korea

[21] Appl. No.: 792,481

[22] Filed: Jan. 31, 1997

[30] Foreign Application Priority Data

Feb. 2, 1996 [KR] Rep. of Korea .................. 96-2535

[51] Int. Cl.$^6$ ............................................. C01F 11/18
[52] U.S. Cl. .................................. 423/432; 423/431
[58] Field of Search ............................... 423/431, 432

[56] References Cited

U.S. PATENT DOCUMENTS 4,157,379   6/1979   Arika et al. .......................... 423/432

FOREIGN PATENT DOCUMENTS 46-5580    2/1971   Japan .................................. 423/432
54-41299   4/1979   Japan .................................. 423/431
57-106522  7/1982   Japan .................................. 423/432
62-202817  8/1987   Japan .................................. 423/431
18911      1/1989   Japan .................................. 423/432
301713    11/1993   Japan .................................. 423/432

*Primary Examiner*—Wayne Langel
*Attorney, Agent, or Firm*—Blakely Sokoloff Taylor & Zafman

[57] ABSTRACT

A process for producing ultrafine particles of colloidal calcium carbonate which comprises the steps of adding magnesium sulfate into an aqueous suspension of calcium hydroxide, carbonating the aqueous suspension by introducing carbon dioxide into the aqueous suspension, and adding zinc sulfate alone or together with sulfuric acid into the aqueous suspension simultaneously with the carbonation step. Ultrafine particles of colloidal calcium carbonate in a chain-structured configuration which have an average diameter of 0.01 μm or smaller, an average length of 0.05 μm or longer, and a BET surface area of 70 m$^2$/g or greater are produced.

2 Claims, No Drawings

PROCESS FOR PRODUCING ULTRAFINE PARTICLES OF COLLOIDAL CALCIUM CARBONATE

BACKGROUND OF THE INVENTION

The present invention relates to a process for the production of calcium carbonate, and in particular, to a process for the production of ultrafine particles of colloidal calcium carbonate.

The demand for synthetic calcium carbonate powders is rapidly growing in recent years in various fields of industry including paper making, processing of rubbers and plastics, and preparation of inks, paints, sealants and other useful products. Synthetic calcium carbonate powders have the excellent whiteness as a pigment and impart mechanical strengths and abrasion resistance when added as a filler to the above end products.

Synthetic calcium carbonate particles are usually prepared by introducing carbon dioxide into an aqueous suspension of calcium hydroxide (known as "milk of lime") to effect the reaction of calcium hydroxide and carbon dioxide precipitating calcium carbonate in a particulate form. The configuration of the calcium carbonate particles obtained in such a method of carbonation of a milk of lime is usually spindle-like, cube-like or needle-like. Calcium carbonate particles having various shapes and sizes may be obtained by changing the reaction conditions such as the concentration of the calcium hydroxide suspension, reaction temperature, manner of reaction, and use or non-use of an additive.

Nowadays, in rubber, plastics, paint, ink, sealant and other industries, synthetic calcium carbonate powders having an average size less than 0.1 μm are required as a functional filler, and colloidal calcium carbonate powders having an average size of about 0.04 μm and about 0.08 μm are mainly used as a surface-treating agent for the above named materials. For high quality of the end products, a high-functional filler is required. Though calcium carbonate powders having an average size of about 0.02 μm are also commercialized, they may not fully satisfy the requirements of industry.

According to a conventional process, calcium carbonate in the form of cubic particles having an average length of one edge of about 0.04 μm may be prepared by introducing carbon dioxide containing gas having a concentration of 20 to 40% by volume of carbon dioxide at a rate of 40 to 100 liters/min. into an aqueous suspension of calcium hydroxide which has a concentration of about 3 to 10% by weight of calcium hydroxide and is maintained at a temperature of about 10° to 20° C. The calcium carbonate powders prepared by the above method may not be suitable as a filler for the above mentioned materials since the powders are prepared together with large aggregated crystals after dehydration, drying and pulverization.

Generally, as the diameter of calcium carbonate particles decreases less than 0.1 μm, the characteristics such as strength and flowability of the end products will be improved and the affinity of aggregation of the particles will be stronger due to an increase of van der Waal's force.

In another conventional process to solve the above problem, the surfaces of calcium carbonate particles produced are coated with a fatty acid, a resin acid and other compounds so as to improve the dispersibility of the particles in the end products. However, it is impossible to coat the surfaces of calcium carbonate particles perfectly and thereby obtain the calcium carbonate particles which may fully satisfy the requirements of industry.

U.S. Pat. No. 3,443,890 (C. G. Sisson et al.) relates to the production of precipitated calcium carbonate of purportedly uniform and fine ultimate particle size. Particles less than about 0.1 μm are precipitated from an aqueous suspension of calcium hydroxide in the presence of about 0.2 to 5% by weight of saccharide or polyol and about 0.2 to 5% of an active $CO_2$ compound.

U.S. Pat. No. 4,018,877 (R. D. A. Wood) describes a carbonation process in which a complex-forming agent for calcium ions is added to an aqueous suspension of calcium hydroxide after the calcium carbonate primary nucleation stage of the carbonation stage and before completion of the carbonation stage. Optionally a long-chain fatty acid or long-chain fatty acid salt is also added preferably after a final carbonation stage.

U.S. Pat. No. 4,367,207 (D. B. Vanderheiden) describes a process in which carbon dioxide is introduced into an aqueous calcium hydroxide slurry containing anionic organopolyphosphonate polyelectrolyte to give a finely divided precipitated calcium carbonate having an average particle size of about 0.01 to 0.03 μm.

U.S. Pat. No. 5,075,093 (H. Tanaka et al.) describes a two-step carbonation method of milk of lime in which partially carbonated milk of lime is admixed with an aqueous carbonating solution containing an alkali metal carbonate or ammonium carbonate and an alkali metal hydroxide or ammonium hydroxide to complete the carbonation of calcium hydroxide. Particles having a platelet-like configuration of a thickness in the range of 0.1 to 0.3 μm and dimensions within the plane of the platelet from 0.5 to 2 μm are obtained.

SUMMARY OF THE INVENTION

It is therefore an object of the present invention to provide a process for producing ultrafine particles of colloidal calcium carbonate free of the drawbacks heretofore experienced.

Another object of the present invention is to provide a process for producing ultrafine particles of calcium carbonate in a chain-structured configuration which have an average diameter of 0.01 μm or smaller and an average length of 0.05 μm or longer.

A further object of the present invention is to provide a process for producing ultrafine particles of calcium carbonate which are very stable due to their stable surfaces and thus do not need any surface treatment, and have a superior quality of dispersibility in the end products.

A still further object of the present invention is to provide a process for producing ultrafine particles of colloidal calcium carbonate which are suitable as a filler for rubber, plastics, paint, ink, sealant and other materials.

The present invention entails a process for the production of ultrafine particles of colloidal calcium carbonate which comprises the steps of (a) adding magnesium sulfate into an aqueous suspension of calcium hydroxide which has a concentration of about 3 to 14% by weight of calcium hydroxide and is maintained at a temperature of about 14° to 30° C., (b) carbonating the aqueous suspension from step (a) by introducing carbon dioxide into the aqueous suspension, and (c) adding zinc sulfate alone or together with sulfuric acid into the aqueous suspension simultaneously with the carbonation step.

According to the present invention, chain-structured ultrafine particles of colloidal calcium carbonate having an average diameter of 0.01 μm or smaller, an average length of 0.05 μm or longer, and a BET surface area of 70 $m^2$/g or greater are prepared.

The inventor suspects that such product may be obtained as a result of an increase in the metastable concentration of calcium carbonate or magnesium bicarbonate, $Mg(HCO_3)_2$, and an increase in the solubility product constant of calcium and carbonate ions, or as a result of calcium carbonate particles with a diameter of 0.01 μm or smaller becoming linked by means of zinc or magnesium compounds.

DETAILED DESCRIPTION OF PREFERRED EMBODIMENT

The terms "diameter" and "length" of a particle as used herein are defined as the shortest and the longest sides of the particle, respectively.

In order to obtain ultrafine particles of colloidal calcium carbonate in a chain-structured configuration, an aqueous suspension of calcium hydroxide is first prepared. The concentration of calcium hydroxide in the aqueous suspension is in the range of about 3 to 14% by weight and the temperature of the aqueous suspension is maintained in the range of about 14° to 30° C.

In step (a), the amount of magnesium sulfate added into the aqueous suspension is preferably in the range of about 0.01 to 0.03 mole per mole of calcium hydroxide initially contained in the aqueous suspension.

In step (c), the amount of zinc sulfate alone or the amount of zinc sulfate and sulfuric acid is preferably in the range of about 0.02 to 0.15 mole per mole of calcium hydroxide initially contained in the aqueous suspension. In the case of zinc sulfate being added with sulfuric acid, the ratio of zinc sulfate to sulfuric acid is preferably in the range of about 1:1 to 10:1 by weight.

If the amount of magnesium sulfate is less than 0.01 mole per mole of calcium hydroxide, or the amount of zinc sulfate alone or the amount of zinc sulfate and sulfuric acid is less than 0.02 mole per mole of calcium hydroxide, the average diameter of the product particles may be larger than 0.01 μm and the BET surface area thereof may be smaller than 70 $m^2/g$.

If the amount of magnesium sulfate is more than 0.03 mole per mole of calcium hydroxide, or the amount of zinc sulfate alone or the amount of zinc sulfate and sulfuric acid is more than 0.15 mole per mole of calcium hydroxide, some large crystals of gypsum may be present in the final product.

If the ratio of zinc sulfate to sulfuric acid is less than 1:1, the average length of the product particles may be smaller than 0.05 μm, and thus having an adverse effect on its dispersibility in the end products. If said ratio is more than 10:1, there may not be any adverse effect on the product quality, but it may be disadvantageous from an economic aspect.

The present invention will now be described in more detail, with reference to the following examples.

EXAMPLE 1

An aqueous suspension of calcium hydroxide having a concentration of 10% by weight of calcium hydroxide was prepared and maintained at a temperature of 25° C. An aqueous solution of magnesium sulfate having a concentration of 10% by weight of magnesium sulfate at a temperature of 25° C. was added into the aqueous suspension at an amount of 0.02 mole of magnesium sulfate per mole of calcium hydroxide initially contained in the aqueous suspension. A gas containing 30% by volume of carbon dioxide was introduced into the aqueous suspension at a rate of 120 liters per minute per kilogram of calcium hydroxide initially contained in the aqueous suspension. Two aqueous solutions, one having a concentration of 10% by weight of zinc sulfate, and the other 10% by weight of sulfuric acid were added into the aqueous suspension simultaneously with the carbonation step, in which the respective amount of zinc sulfate and sulfuric acid were equivalent to 0.05 mole and 0.02 mole per mole of calcium hydroxide initially contained in the aqueous suspension.

When the aqueous suspension reached a pH of 6.8, the aqueous suspension was concentrated to 50% by weight of solids through a filter press, and the final aqueous suspension was dried, pulverized and classified to be produced as final dry powders. According to the process, ultrafine powders in a chain-structured configuration had an average diameter of about 0.008 μm, an average length of about 0.05 μm as measured by electron microscopy analysis, and a BET surface area of about 90 $m^2/g$.

EXAMPLE 2

Colloidal calcium carbonate was prepared by following the procedure of Example 1 but the respective amount of magnesium sulfate, zinc sulfate and sulfuric acid were 0.01 mole, 0.02 mole and 0.01 mole per mole of calcium hydroxide. The final product had a BET surface area of about 72 $m^2/g$.

EXAMPLE 3 AND COMPARATIVE EXAMPLES A, B AND C

Colloidal calcium carbonates were prepared by following the procedure of Example 1 but the respective amounts of magnesium sulfate, zinc sulfate and sulfate acid were changed. The specific experimental conditions and the characteristics of the products together with those of Examples 1 and 2 are shown in Table 1.

APPLICATION EXAMPLE

Calcium carbonate products prepared by Example 1 and Comparative Example C were respectively used as a filler for a synthetic rubber. The formulation recipe and the test results of the end products are shown in Table 2.

TABLE 1

| | Aq. suspension of Ca(OH)$_2$ | | Carbonation | | Additives | | | BET surface | |
|---|---|---|---|---|---|---|---|---|---|
| | Conc. | Temp. | Conc. | Flow rate liters/min. | mole/mole of Ca(OH)$_2$ | | | area | |
| Ex. | wt. % | °C. | vol. % | kg Ca(OH)$_2$ | MgSO$_4$ | ZnSO$_4$ | H$_2$SO$_4$ | $m^2/g$ | Dispersibility[1] |
| 1 | 10 | 25 | 30 | 120 | 0.02 | 0.05 | 0.02 | 90 | ⊙ |
| 2 | 10 | 25 | 30 | 120 | 0.01 | 0.02 | 0.01 | 72 | ⊙ |
| 3 | 10 | 25 | 30 | 120 | 0.03 | 0.08 | 0.03 | 95 | ⊙ |
| A | 10 | 25 | 30 | 120 | 0.005 | 0.02 | 0.01 | 60 | Δ |

TABLE 1-continued

| | Aq. suspension of Ca(OH)$_2$ | | Carbonation | | Additives mole/mole of Ca(OH)$_2$ | | | BET surface | |
|---|---|---|---|---|---|---|---|---|---|
| | Conc. | Temp. | Conc. | Flow rate | | | | area | |
| Ex. | wt. % | °C. | vol. % | liters/min. kg Ca(OH)$_2$ | MgSO$_4$ | ZnSO$_4$ | H$_2$SO$_4$ | m$^2$/g | Dispersibility[1] |
| B | 10 | 25 | 30 | 120 | 0 | 0.02 | 0.01 | 40 | Δ |
| C | 10 | 25 | 30 | 120 | 0 | 0 | 0 | 28 | X |

Note
(1) Each symbol designates the degree of dispersibility in the final product as follows:
⊙: excellent, ○: good, Δ: average, X: bad.

TABLE 2

| Formulation | | |
|---|---|---|
| SBR 1502 | 100 | parts by weight |
| Zinc oxide | 5 | |
| Stearic acid | 1 | |
| Accelerating agent DM | 1.5 | |
| Accelerating agent TS | 0.1 | |
| Sulfur | 2 | |
| Calcium carbonate filler | 100 | |

| | Ex. 1 | Ex. 2 |
|---|---|---|
| 300% Modulus (kg/cm$^2$) | 23 | 17 |
| Tensile strength (kg/cm$^2$) | 190 | 64 |
| Elongation (%) | 790 | 560 |
| Hardness | 66 | 58 |

It is evident from the Examples that the process according to the present invention provides ultrafine particles of colloidal calcium carbonate which show lower affinity of aggregation and superior homogeneity and dispersibility in the end products.

Therefore, the product powders according to the present invention can be used as a filler for rubber, plastics, paint, ink, sealant and other materials since the characteristics such as strengths and flowability of the above materials are highly improved.

What is claimed is:

1. A process for producing chain-shaded ultrafine particles of colloidal calcium carbonate having an average diameter not greater than 0.01 μm, and an average length not less than 0.05 μm, the process comprising the steps of:

(a) adding magnesium sulfate into an aqueous suspension of calcium hydroxide having a concentration of 3 to 14% by weight and a temperature of about 14° to 30° C., the amount of magnesium sulphate added being in the range of 0.01 to 0.03 moles per mole of the calcium hydroxide initially contained in the aqueous suspension;

(b) carbonating said aqueous suspension from step (a) by introducing carbon dioxide thereinto; and (c) adding zinc sulfate alone or together with sulfuric acid into the aqueous suspension simultaneously with the carbonation step the amount of the zinc sulphate or the amount of the zinc sulfate and the sulfuric acid being in the range of 0.02 to 0.15 moles per mole of the calcium hydroxide initially contained in the aqueous suspension and, in the case of the zinc sulfate being added with sulfuric acid, the ratio of the zinc sulfate to the sulfuric acid being in the range of 1:1 to 10:1 by weight.

2. The process of claim 1, wherein said colloidal calcium carbonate particles have a BET surface area not less than 70 m$^2$/g.

* * * * *

UNITED STATES PATENT AND TRADEMARK OFFICE
CERTIFICATE OF CORRECTION

PATENT NO. : 5,750,086
DATED : May 12, 1998
INVENTOR(S) : You

It is certified that error appears in the above-identified patent and that said Letters Patent is hereby corrected as shown below:

In claim 1, at line 1, please delete "chain-shaded" and insert --chain-shaped--.

In claim 1, at line 8, please delete "30°C.," and insert --30°C,--.

Signed and Sealed this

Fifteenth Day of June, 1999

Attest:

Q. TODD DICKINSON

*Attesting Officer*     *Acting Commissioner of Patents and Trademarks*